FIG. 1
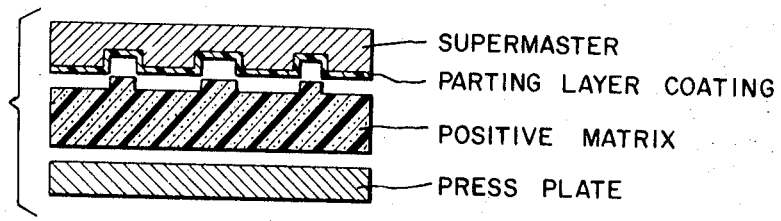
- SUPERMASTER
- PARTING LAYER COATING
- POSITIVE MATRIX
- PRESS PLATE FIG. 2
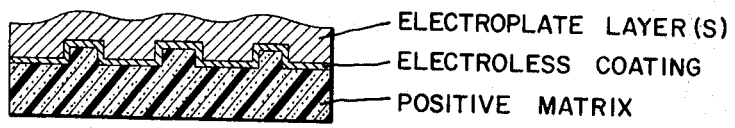
- ELECTROPLATE LAYER(S)
- ELECTROLESS COATING
- POSITIVE MATRIX FIG. 3
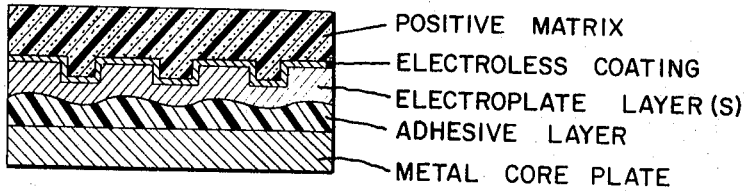
- POSITIVE MATRIX
- ELECTROLESS COATING
- ELECTROPLATE LAYER(S)
- ADHESIVE LAYER
- METAL CORE PLATE FIG. 4
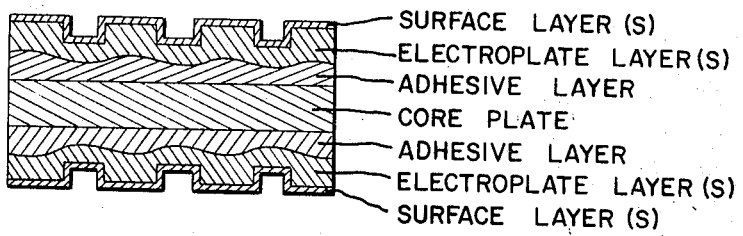
- SURFACE LAYER(S)
- ELECTROPLATE LAYER(S)
- ADHESIVE LAYER
- CORE PLATE
- ADHESIVE LAYER
- ELECTROPLATE LAYER(S)
- SURFACE LAYER(S)

INVENTORS
ISRAEL S. UNGAR
HERBERT I. SCHER

BY
ATTORNEY

United States Patent Office 3,532,587
Patented Oct. 6, 1970

3,532,587
PRESS PLATE
Israel S. Ungar and Herbert I. Scher, Randallstown, Md., assignors, by mesne assignments, to Esso Research and Chemical Company, a corporation of Delaware
Filed Aug. 4, 1966, Ser. No. 570,282
Int. Cl. B29c 1/00; B32b 31/12
U.S. Cl. 161—120
10 Claims

ABSTRACT OF THE DISCLOSURE

A laminated die, used in an environment of high pressure and heat to form commercial textured high pressure laminates by a laminating procedure, is formed by electroplating an electroconductive irregular surface of a positive matrix to provide a metallic layer, by then laminating under heat and pressure the electroplated layer with the positive matrix backing against a deformation resistant dimensionally stable metal core plate using an intermediate heat resistant adhesive layer, and by finally stripping off the positive matrix from the electro deposited layer to thereby provide the textured die

---

The present invention relates to the production of laminates having textured surfaces, and more particularly to the press plate dies for forming such laminates and the method of forming such negatively surfaced press plate dies.

Conventionally, in the manufacture of laminated products comprising resin impregnated sheets, it is usual to press a plurality or "book" of the impregnated sheets between steel plates under great heat and pressure to provide "high pressure laminates." These plates are quite adequate for the production of smooth surface laminates. However, when it is desired to form the laminates having a three-dimensional texture on the surface thereof, the use of such steel dies becomes excessively expensive. Thus, each pattern, and many patterns may be desirable, must be etched or machined into a separate steel die plate. In addition, not only is each die very expensive, but in use the three-dimensional texture in a particular individual die will eventually lose its definition and the dies must therefore be often replaced.

It has been proposed to produce such dies out of other materials having the desired configuration, but such production has not been entirely successful. The dies produced by some of these methods do not, in turn, produce satisfactory laminates. In addition, some of the dies do not lend themselves to effective and economical processing of the laminate products. Furthermore, some of these production methods have not been able to economically produce a plurality of die plates having exactly the same configuration.

Many of the above-indicated problems in the prior art have been solved by the procedure disclosed in the copending applications of Michaelson et al. Ser. No. 291,959, filed July 1, 1963, now Pat. No. 3,303,081, and Ser. No. 497,426, filed Oct. 18, 1965 now Pat. No. 3,311,-520. The pressing plates made by the aforementioned processes are very inexpensive and yet are capable of satisfactorily forming three-dimensional textunred laminates. However, the pressing plate dies made by such procedures, as well as those of the prior art, require the use of parting membranes or layers during their use to form the commercial textured laminates. Such parting membranes, usually silicone resin impregnated glassine paper, are expensive, can be used only once, and increase the complexity of the molding operation by requiring additional handling; these layers are also very thin and may wrinkle, thereby rendering the product commercially unsuitable and, in addition, they may provide an additional site for the inclusion of dirt particles to provide other laminate defects.

It is, therefore, an object of the present invention to obviate the defects and disadvantages of the prior art, such as indicated above.

It is another object of the present invention to provide a method of economically manufacturing negatively textured pressing plate dies which obviate the above disadvantages.

It is another object of the present invention to provide pressing plate dies which are useful in the manufacture of high pressure decorative laminates having three-dimensional textures therein.

It is another object of the present invention to provide a pressing plate die for laminating, which is highly effective, has a long life, may be used without the need of parting membranes and is inexpensive.

It is another object of the present invention to provide for the production of a large variety of new surfaces in a convenient and economical manner.

It is another object of the present invention to provide a method which can produce an indefinite number of pressing plate dies from a single use of an original patterned material.

It is another object of the present invention to prepare a large number of pressing plate dies with the identical surface configuration.

It is another object of the present invention to provide pressing plate dies which have the desirable characteristics of metal dies without their disadvantages.

Other objects and the nature and advantages of the instant invention will be apparent from the following description taken in conjunction with the accompanying drawings, wherein:

FIGS. 1–4 show in section a schematic flow representation of certain of the steps of the process of the present invention, FIG. 4 showing a resultant two-side-good negative press plate die.

FIG. 1 shows the removal of the initial press plate or supermaster after the formation of a positive matrix which is used in the present invention. This positive matrix may be formed in a conventional manner from a stack or "book" of thermosetting resin impregnated fiber sheets. Thus, as shown in FIG. 1, the positive textured matrix may be formed by laminating against an etched or machined supermaster which has the negative configuration of the ultimate commercial laminate desired to be produced, or it may be produced against a natural pattern imparting material in a manner similar to that disclosed in the copending applications of Michaelson et al. referred to above. In fact, the positive matrix may be any conventional, commercial textured laminate.

For example, it may be particularly useful to utilize as the supermaster, the "negative master" shown in FIG. 2 of the Michaelson et al. Pat. No. 3,311,520. The positive matrix is formed merely by squeezing the "book" of resin impregnated sheets between the supermaster, which has a parting layer coating thereon, and a conventional flat press plate. Preferably, the parting layer coating comprises a fluorocarbon telemer dispersion (e.g. Vydax AR, made by Du Pont), although any non-stick fluoronated hydrocarbon dispersion, such as polytetrafluoroethylene in a suitable suspending medium, or a parting membrane, such as silicone impregnated paper, may be used if desired. Upon separation of the supermaster and the press plate, as shown in FIG. 1, the positive matrix may be removed for the next textured press plate forming step.

An important feautre of the present invention is the provision of a conductive surface on the positive matrix. This may be accomplished during the molding of the positive matrix by including a conductive material such as carbon or a metal as a filler or by molding a conductive surface into the matrix, e.g., by coating the upper layer prior to molding with metal or carbon. However, it is preferred to render the matrix electro-conductive by applying a conductive coating to its textured surface after cleaning thereof. The conductive coating may be nickel, copper, silver or any other conductor and it may be applied as a paint, it may be precipitated or vacuum deposited as a silver mirror, or it may be formed by depositing very fine carbon or very fine powdered metal in an even layer upon the textured surface. The preferred deposition method involves the application of an electroless layer, such as an electroless nickel layer.

Thus, after formation of the positive matrix, it is preferred to coat the matrix textured surface with a suitable electroless coating, applied in a conventional manner known in the electroplating art. The electroless coating may be applied such as by washing the textured surface of the positive matrix with a solution of a metal salt which will deposit the metal in a very thin layer on the textured surface. The procedures of Wilson et al. #3,006,819 or Radovsky et al. #3,099,608 are preferred.

After the deposition of the electroless nickel coating, a layer of suitable metal is then electroplated thereover, also in a manner well known in the electroplating art. While any metallic layer may be so electroplated, it is preferred to electroplate nickel over the electroless nickel layer, although copper also provides excellent results. If nickel is used, it should be directly overplated with copper. As can be seen from FIG. 2, the electroplated layer(s) are considerably thicker, i.e. 2–7 mils and preferably about 6 mils, than the electroless nickel and the increased thickness not only gives greater strength to the electroplated layer(s), but it also provides a certain, although small, amount of "leveling," i.e., the loss of texture through the thickness of the copper and/or nickel and the relative smoothness of the upper surface of the copper is shown in FIG. 2. Such "leveling" may also be increased by adding conventional leveling agents to the electroplating bath in a manner known in the electroplating art.

As in the Michaelson et al. application Ser. No. 497,426, an important feature of the present invention lies in the provision of a deformation resistant, dimensionally stable metal core for each textured pressing plate die. Although the metal plate may be formed of any material, a 20-gauge steel plate is preferably used. In the present invention, however, in contrast to that of Michaelson et al. Pat. No. 3,311,520, the dimensionally stable plate is laminated to the electroplated copper layer which has been deposited on the positive matrix. Prior to its lamination, the metal plate as well as the upper copper surface of the electroplated layer(s) must be cleaned to remove all dirt and grease and this is preferably accomplished by washing with isopropyl alcohol and then with an aqueous solution of ammonia and detergent. Prior to laminating, the steel plate is then coated on one surface or both of its surfaces (depending upon whether a one-side-good or a two-side-good pressing plate die is to be formed) with a suitable adhesive. The upper copper surface on the positive matrix is also preferably coated with adhesive.

The adhesive may be a heat activatable, high temperature resistant organic adhesive, such as is utilized in the copending application of Michaelson et al. Pat. #3,311,520. One adhesive wyhich has been found to be particularly effective is a rubber phenolic adhesive (i.e., EC 1359 made by the 3-M Company; this adhesive is a nitrile rubber modified phenolic resin dissolved in acetone and methyl isobutyl ketone). High temperature resistant epoxy-rubber adhesives are also useful. Other adhesives which may be utilized include those described in the Rice et al. Pat. #3,219,515 or in the patents to Been et al. #2,920,990; Bader et al. #2,981,650, or Howard et al. #2,991,258. A phenolic resin impregnated paper sheet may also be used as the adhesive layer; or a resin impregnated sheet or sheets, the outer surfaces of which have been precoated with a heat-activatable metal adhering adhesive, may also be used.

In place of an organic adhesive, it has been found that a metallic solder may be particularly desirable. In such a case, the core and/or the upper copper layer of the matrix may be coated in any suitable manner, such as by spraying the molten solder thereon or by passing the core through a vat of molten solder; however, it is preferred to electroplate both the core and the upper copper surface of the matrix with electrolytic tin-lead solder.

As shown in FIG. 3, the dimensionally stable steel core plate with the adhesive coating thereon is placed in face-to-face relationship with the upper surface of the copper electroplate layer on the positive matrix which is also preferably coated with the desired adhesive. The assembly is then laminated under heat and pressure to adhere the copper electroplate layer to the metal core plate via the adhesive. A pressure of about 100–600 p.s.i. has been found satisfactory to effect such lamination under a temperature of about 390° F. or more if the metallic solder is used as the adhesive. The temperature used must be one which will effect activation of the adhesive if it is an organic adhesive or melting of the solder if such is used in place of an organic adhesive; for the organic adhesives 280–320° F. has proven satisfactory to effect curing under a pressure of about 1000 p.s.i. for about ½ hour. The laminating conditions in general may be routinely determined for any given adhesive.

After the lamination between the electroplated copper layer and the metal core plate, the positive matrix is peeled or delaminated from the textured surface of the so transferred and reversed electroplate layer. This exposes the electroless nickel surface which is an exact negative replica of the positive matrix. A critical feature of the present invention is the retention of the positive matrix on the electroplated metal layer during the lamination step. This is necessary because the thin electroplated copper and/or nickel layer is not entirely flat, i.e. it has peaks and valleys on the surface to be laminated and has a non-uniform thickness, i.e. there are waves in the metal. Thus, if the matrix were stripped off before the lamination step, the high pressures resulting during the lamination would flatten out the texture during the laminating operation and destroy the accuracy of the desired texture.

On the other hand, with the matrix in place during the bonding, the peaks and valleys in the metal layer are supported by the rigid complementary valleys and peaks in the positive matrix. The adhesive between the electroformed layer and the flat metal core plate therefore flows and conforms to the peaks and valleys during the lamination. During the use of the resultant textured pressing plate die, the adhesive layer thus acts as a permanent reinforcing layer for the surface detail and such a textured press plate die may be used over and over to form textured laminates at pressures exceeding 1000 p.s.i.

Because the electroless layer is very weakly bonded to the positive matrix, the matrix may be easily peeled therefrom. The positive matrix, after its delamination, may be either thrown away or it may be used again to form another textured press plate die.

After stripping of the matrix from the electroless nickel copper surface of the plate, the transferred and reversed textured upper surface may be plated with a nickel electroplate layer of about ½–1 mil thickness to provide a different degree of gloss. The gloss on the surface of the die may be controlled by the choice of plating solutions, current density and temperature, e.g. by electropolishing or electroetching, in manners known per se in the electroplating art and/or the gloss may be controlled by mechanical processing of the nickel layer such as by polishing or grinding. If nickel has been used as the electroless layer, the gloss may be suitable and no further nickel coating may be necessary.

Regardless of how the upper nickel layer is provided, it is usually desirable to electroplate the nickel with a very thin chromium layer of only about 8×10⁻⁶ inches. The purpose of the chromium layer is to provide increased scratch resistance to the die surface, but such chromium layer does not effect the micro finish of the nickel layer thereunder.

As can be seen from FIG. 4, the resultant textured press plate die may be a two-side-good die rather than just one-side-good as is shown being produced in FIG. 3. Such press plate dies may be used in a conventional manner to form laminates having a three dimensional textured surface. However, a particular advantage of such a die is that it obviates the necessity of utilizing a silicone resin impregnated paper parting membrane in the formation of commercial textured laminate products. In addition, the negative press plate dies formed by the present invention are highly effective and are dimensionally stable over long usage.

The following examples are included by way of illustration only and are not to be taken as limiting the invention:

EXAMPLE I

A supermaster, as shown in FIG. 1, is coated with a dispersion of Vydax AR which is rubbed on by hand and then wiped off and dried to obtain a uniform coating. A "book" of twenty sheets of phenolic impregnated kraft paper is then laminated under 1000 p.s.i. and 150° C. for ten minutes between the supermaster and a conventional smooth press plate to produce a positive matrix such as shown in FIG. 1. The positive matrix is then removed from between the press plate and the supermaster and its textured surface is washed with a nickel containing solution to deposit a thin electroless nickel coating thereon. The positive matrix with the electroless nickel coating thereon is then passed through an acid copper plating bath and a copper layer of approximately 6 mils thickness is plated over the electroless coating. A twenty gauge steel plate is washed with isopropyl alcohol and then with ammonia containing detergent on one of its surfaces. The metal plate is then coated with rubber phenolic (EC 1359) adhesive on the surface which has been cleaned and the adhesive is then air dried. The upper surface of the electroplated copper layer is then placed face down over the adhesive on the steel plate. The assembly is cured for twenty-five minutes under 300° F. and 1000 lbs. per square inch pressure. The assembly is thereby consolidated into a hard essentially metallic laminate having a steel bottom, a rubber-phenolic adhesive layer thereover, a copper layer of about 6 mils thickness having a texture therein and the positive matrix in complementary relationship to the textured copper layer. The positive matrix is stripped from the electroless nickel layer and such layer is then electroplated with a 1 mil layer of nickel to provide a glossy surface. The nickel is then plated with a very thin chromium layer of 8×10⁻⁶ inches to improve the scratch resistance thereof. The resultant one-side-good negative textured press plate die may then be used for the molding of textured laminates in a generally conventional manner; however, in such use it is not necessary to utilize silicone resin impregnated parting membranes.

The deposition of the electroless coating per se may be carried out as is known in the Wilson et al. Pat. No. 3,006,819. Similarly, the electroplating of the copper on the electroless layer per se as well as the separate steps of electroplating the nickel and chromium layers on top of the copper electroplate layer may also be carried out in a manner known in the electroplating art.

EXAMPLE II

The process of Example I is repeated except that two electroconductive matrices are provided with textured copper layers and both sides of a steel plate are cleaned and coated with adhesive. The metal plate is then pressed between the two electroplated matrices to effect lamination between the metal plate and the two textured electroplated copper layers. The matrices are then stripped from the laminate and the two sides are electroplated first with nickel to provide a layer of about ½ mil thickness and then the nickel surfaces are electroplated with a very thin layer of chromium, to improve the scratch resistance.

EXAMPLE III

Pressing plate dies made in accordance with Examples I and II are used to make commercial textured laminates in accordance with the following procedure. A conventional assembly of phenolic impregnated core paper, a melamine resin impregnated pattern sheet and a melamine resin impregnated oversheet are stacked in that order. This whole assembly is placed on a metal plate and a two-side-good pressing plate die made in accordance with Example II is placed on the paper assembly. A second resin impregnated paper assembly in reverse order and with the melamine resin impregnated oversheet facing downwardly is then placed on top of the two-side-good pressing plate die. Another metal plate is then placed over the upper phenolic impregnated core sheet. A third assembly of resin impregnated core paper is then placed on the upper metal plate with the melamine resin impregnated oversheet facing upwardly. A press plate die formed in accordance with Example I is then placed with its textured face down in contact with the melamine resin impregnated oversheet of the upper assembly. The entire stacked assembly is then placed within a press and is cured under heat and pressure utilizing conventional operating conditions. The three finished textured laminates are easily stripped from the chromium surfaces of the pressing plate dies and such textured laminates have a desirable gloss. It has been found that the pressing plate dies may be used repeatedly without deformation and continue to provide highly satisfactory commercial textured laminates.

EXAMPLE IV

The process of Example I is repeated except that a nickel layer of 1 mil is electroplated directly over the electroless nickel coating on the positive matrix. A 4 mil layer of copper is then electroplated over the nickel layer from a bath containing leveling agents. A 20 gauge steel core-plate and the electroplated positive matrix are then both electroplated with 2 mil layers of electrolytic tin-lead solder. The core plate is then laminated at 400° F. and under 500 p.s.i. to the coated positive matrix via the tin-lead solder layers. After stripping of the positive matrix from the press plate die, the upper nickel layer is plated with an ultra-thin coating of several microinches of chromium and the press plate die is ready for use in accordance with Example III.

EXAMPLE V

The die produced in accordance with Example IV is used to make a series of commercial decorative textured laminates under known operating conditions. One such laminate is then used as a positive matrix to form an additional pressing plate die in accordance with the following procedure:

The laminate is cleaned with MIBK (methylisobutylketone) and is then washed with water and distilled water. After washing, the laminate matrix is etched for 20–30 seconds at room temperature in a chromic acid solution which may, if desired, contain a wetting agent. The etching solution is then washed off with water and deionized water.

The etched matrix is then treated at about 140° F. for about 4 minutes with a solution of 0.4% palladous chloride, 50% distilled water, 4.5% stannous chloride, and remainder 37% strength HCl. The so activated matrix is then sequentially washed in tap water and deionized water.

The matrix is then dipped into an electroless nickel bath of 3% nickel chloride, 1% sodium hypophosphite, 5% ammonium chloride, 10% sodium citrate and 81% water at a temperature of 145–155° F. The matrix is retained in the bath for 4–7 minutes, and after removal, has a thin electroless nickel coating thereon.

The coated matrix is then placed in a sulfamite nickel electroplating bath of pH 3–5 comprising 450 gm./l. of nickel sulfamate and 30 gm./l. of boric acid (the bath may also contain 4 gm. of detergent, if desired). A nickel deposit of ½–1 mil is plated over the electroless nickel coating by the application of direct current at 40 amp/ft.$^2$ for 30 minutes at 160° F. The matrix is then washed with water and deionized water and then passed to an acid copper plating bath, containing 30 oz./gal. of copper sulfate and 7.5 oz./gal. of sulfuric acid at a pH of 4, where it receives a copper plate of about 5 mils, under a current of 40 amp./ft.$^2$ and at room temperature. The matrix is then washed.

The resultant matrix, essentially as shown in FIG. 2, and a steel core plate are then both electroplated with a 1 mil thickness tin-lead solder layer from a fluoroborate bath containing, on a 16 gallon basis, 31.5 lbs. tin fluoroborate, 12.4 lbs. lead fluoroborate, 24.3 lbs. fluoroboric acid, 2.25 lbs. boric acid, ½ lb. peptone and remainder water. The conditions of electroplating are the same as above and both the bath and the anode comprise 60% tin and 40% lead.

The electroplated solder melts at 375° F. and the lamination of the solder coated core plate and the solder plated matrix is therefore carried out at 400° F., under 200 p.s.i. The matrix is then stripped from the laminate, leaving the electroless nickel layer as the uppermost layer. This is found to have the desired gloss for the particular commercial laminates to be produced and, hence, no further nickel plating is necessary. However, an ultra-thin layer of chrome is plated over the electroless nickel layer from a chromic acid bath of 250 gm./l. of chromic acid and 2.5 gm./l. of sulphuric acid at 97–100° F. for 5 minutes at 100 amp/ft.$^2$. The final thickness of the resultant press plate die is about 100 mils, most of which comprises the core plate.

The dies of the present invention are found to have the same advantages of the dies of the Michaelson et al. Pat. No. 3,311,520. In addition, the press plate dies of the present invention obviate the necessity of using a parting layer in the production of the commercial textured laminates. Thus the press plates dies of the present invention can be made at a relatively negligible cost in comparison with the price of photoetched, electroplated and polished metal plates which are extremely expensive. Also, the elimination of parting membranes in the production of the commercial textured laminates, such as silicone impregnated parting membranes, greatly reduces the costs of the production of such laminates.

It will be obvious to those skilled in the art that various changes may be made without departing from the scope of the invention and therefore the invention is not limited to what is shown in the drawings and described in the specification.

What is claimed is:
1. In a laminating pressing plate die for use in an environment of high pressure and heat comprising a laminated structure having a three dimensional textured surface for imparting a texture to the laminate molded thereagainst and a deformation resistant and dimensionally stable metal core plate, the improvement comprising a transferred and reversed electroplate-metal laminated to said core plate with an adhesive resistant to high pressure laminating conditions, the upper surface of said reversed electroplate-metal layer having said texture imparted therein, the cross-sectional configuration of said transfer layer varying along its length and width but being of generally uniform thickness, the cross-sectional thickness of said resistant adhesive varying along its length and width.

2. A laminating die in accordance with claim 1 wherein a transferred and reversed electroplate-metal layer is adhesively laminated to both surfaces of said core plate.

3. A laminating die in accordance with claim 1 wherein said electroplate-metal layer comprises nickel.

4. A die in accordance with claim 3 wherein an electroplate copper layer underlies said nickel layer.

5. A die in accordance with claim 4 wherein said copper layer has a thickness of about 3–7 mils.

6. A die in accordance with claim 5 wherein said nickel is about ⅓–1 mil thick and wherein said nickel is coated with a very thin layer of chromium having a thickness in the order of $8 \times 10^{-6}$ inches.

7. A die in accordance with claim 1 wherein said resistant adhesive is selected from the group consisting of an organic, heat activatable, high temperature resistant adhesive, and a metal solder.

8. A method of manufacturing a pressing plate die for use in an environment of high pressure and heat comprising: forming a positive matrix having an electro-conductive surface;

electroplating said electro-conductive positive surface to provide a metallic layer thereon;

laminating said electroplated layer, with said positive matrix forming a backing thereon, against a deformation resistant dimensionally stable metal core plate via an intermediate heat resistant adhesive layer, utilizing heat and pressure to effect said lamination; and stripping off said positive matrix from said electrodeposited layer to obtain said textured pressing plate die for use in forming by lamination commercial textured plastic laminates.

9. A method in accordance with claim 8 comprising: depositing an electroless metal layer on said positive matrix to form said electro-conductive surface thereon.

10. A method in accordance with claim 8 further comprising electroplating a metal solder over said electroplate metallic layer and over said stable metal core prior to said laminating, said metal solder serving as said intermediate heat resistant adhesive layer.

References Cited

UNITED STATES PATENTS

| 2,632,722 | 3/1953 | Libberton | 161—120 XR |
|---|---|---|---|
| 3,006,819 | 10/1961 | Wilson et al. | 204—15 |
| 3,042,591 | 7/1962 | Cado | 204—15 |
| 3,099,608 | 7/1963 | Radousky et al. | 204—15 |
| 3,303,081 | 2/1967 | Michaelson et al. | 156—323 XR |
| 3,311,520 | 3/1967 | Michaelson et al. | 156—289 XR |
| 3,355,263 | 11/1967 | Du Rose et al. | 29—194 XR |
| 2,400,518 | 5/1946 | Kreber et al. | 204—6 |
| 2,462,570 | 2/1949 | Terry | 204—6 |
| 2,670,326 | 2/1954 | Bungay | 204—6 |
| 3,356,598 | 12/1967 | Cabau | 204—15 |
| 3,424,635 | 1/1969 | Grandinetti et al. | 156—150 |

JOHN T. GOOLKASIAN, Primary Examiner

G. W. MOXON II, Assistant Examiner

U.S. Cl. X.R.

18—17, 44; 29—183.5, 194, 195; 156—150, 151, 209, 219, 232, 233, 245, 249, 289, 581; 204—6; 264—293

UNITED STATES PATENT OFFICE
CERTIFICATE OF CORRECTION

Patent No. 3,532,587     Dated October 6, 1970

Inventor(s) Israel S. UNGAR and Herbert I. SCHER

It is certified that error appears in the above-identified patent and that said Letters Patent are hereby corrected as shown below:

In column 1, lines 2 and 3, the name of the assignee should read as follows:

Esso Research and Engineering Company.

Signed and sealed this 23rd day of March 1971.

(SEAL)
Attest:

EDWARD M. FLETCHER, JR.
Attesting Officer

WILLIAM E. SCHUYLER, JR.
Commissioner of Patents